UNITED STATES PATENT OFFICE 2,570,686

PROCESS FOR MAKING TIN HYDROCARBONS

Ernest W. Johnson, Mountainside, and James M. Church, Tenafly, N. J., assignors to Metal & Thermit Corporation, New York, N. Y., a corporation of New Jersey No Drawing. Application May 4, 1948, Serial No. 25,087

11 Claims. (Cl. 260—429)

This invention relates to a process for making tin hydrocarbon compounds such as tin aryls and tin aryl-alkyls. More particularly, it relates to a two-stage process which permits of better control of the reactions involved and which results in improved yields of product.

Generally speaking, the invention comprises a two-stage process for making organo-tin compounds in which the organo portion of the compounds consists of hydrocarbon radicals from the group consisting of aryl and mixed aryl-alkyls, which comprises: reacting to completion in a first stage an aryl monohalide with finely divided sodium dispersed in an inert hydrocarbon solvent at a temperature of about 30 to about 50° C. to produce an aryl-sodium compound, then in a second stage reacting said sodium compound suspended in the inert solvent with $RxSnCly$, in which R is an alkyl radical, Sn is tin, Cl is chlorine, $x$ is a whole number having a value in the range of 0 to 3, and $y$ is a whole number equal to $4-x$, at a temperature of about 25 to about 50° C. to produce the organo-tin compound as above identified, and recovering the latter.

As will be evident, the compounds covered by the formula $RxSnCly$, hereinafter referred to as stannic chloride or substituted stannic chloride, may include stannic chloride and alkyl tin chlorides such as butyl tin trichloride, dibutyl tin dichloride, tributyl tin chloride, and compounds similar to the latter in which the butyl group is replaced by other alkyl groups such as propyl, isobutyl, amyl, lauryl, etc.

The organo-tin compounds that may be produced include such specific compounds as tetraphenyl tin, butyl triphenyl tin, dibutyl diphenyl tin, tributyl phenyl tin, tetratolyl tin, amyl triphenyl tin, and the like. Tin tetraaryls such as tetraphenyl tin and tetratolyl tin may be made by converting an aryl halide such as phenyl chloride or tolyl chloride to the corresponding sodium compound, i. e. sodium phenyl or sodium tolyl, and then reacting the latter with stannic chloride. Tin aryl-alkyls such as butyl triphenyl tin may be made by first forming sodium phenyl and then reacting it with butyl tin trichloride. If a mixed aryl-alkyl tin like dibutyl diphenyl tin or tributyl phenyl tin is desired, the sodium phenyl is reacted with dibutyl tin dichloride or tributyl tin chloride, respectively. In other words, the number of alkyl groups present in the substituted stannic halide will appear in the final product; if none are present, the product will also have none.

Among the advantages of producing the tin hydrocarbon products in two steps or stages, rather than in one as has heretofore been suggested, is that the reaction in each stage may be better controlled, particularly from the standpoint of the heat effect. While both reactions are considerably exothermic, the heat effect, however, in the event that it is attempted to run them simultaneously in one overall step or reaction, is apt to be unpredictable. For example, on the one hand the overall reaction may tend to proceed fitfully, as in spurts, or stop entirely, during the mixing and/or addition of reactants, and such tendency may be manifested over an indefinite period. Further addition of reactants may or may not cause the reaction to proceed smoothly. On the other hand, if and when the reaction does take hold again, it does so in such a violent manner as to become uncontrollable. As it is desirable to produce the tin hydrocarbon products at relatively low temperatures, say 40 to 45° C., and thus reduce the occurrence of side reactions and the necessity of refluxing, it is very difficult, if not impractical, to run the overall reaction on a commercial scale at these temperatures. By running each reaction separately in stages, each proceeds smoothly and without interruption and results in improved yields.

Referring to the first stage of the process in detail, the hydrocarbon monohalide starting material that may be converted depends on the product desired and may include such aryl halides as phenyl chloride, tolyl chloride, chlorethylbenzene, naphthyl chloride, etc. Other halides besides chlorides, such as the bromides and iodides, may be employed.

The sodium is preferably employed in finely divided form dispersed in an inert hydrocarbon solvent such as benzene, toluene, kerosene, cyclohexane, and various petroleum fractions of suitable boiling range. The quantity of sodium should be equivalent to the hydrocarbon halide; thus about 2 mols of sodium are required for about 1 mol of hydrocarbon halide, a mol ratio of about 2 to 1. The amount of solvent relative to the sodium should be at least sufficient to provide a fluid mixture or mass of sodium and solvent. On the basis of the hydrocarbon halide, the solvent may vary from about 1 to 6, and preferably about 5, times by weight.

The temperature of the reaction is preferably about 40° C. and may range from about 30 to 50° C. The reaction time is variable and will depend upon the rate of addition of the halide to the sodium and the time required to keep the reaction mixture within the desired temperature range. It is essential, however, that sufficient time be allowed to permit the reaction to be completed so as to form the maximum yield of the organo-sodium compound. In practice, about one hour, more or less, has proved to be sufficient. The pressure is atmospheric.

The reaction product, i. e., the organo-sodium compound, is generally in the solid state suspended in the inert solvent along with a sodium halide salt, which latter may or may not be separated from the product. Usually it is not separated until after the second stage reaction has gone to completion. Yields of the organo-sodium product are about 80%.

The second stage of the process is initiated by adding stannic chloride or substituted stannic chloride to the product of the first reaction suspended in the inert solvent. The same or a different reactor may be employed in this stage. The amount of stannic chloride or substituted stannic chloride should be equivalent to the amount of hydrocarbon halide, that is, about one mol per 4 mols of hydrocarbon halide, but it may also be equivalent to the sodium derivative of the hydrocarbon on a molar basis. The temperature of the second stage reaction is preferably from about 45 to about 50° C. but may range as low as 25° C. As in the first stage reaction, side reactions and refluxing temperatures are avoided. The reaction time should be such as to permit the reaction to be completed, and in general will be of the same order as in the first reaction. The pressure again is atmospheric. The product, the organo-tin compound, is obtained in solution in the solvent in yields ranging up to about 80% based on the sodium-hydrocarbon compound. Based on the hydrocarbon halide, the yields range up to about 65%.

The solution containing the product may be warmed to a point above room temperature, say about 80° C., and filtered to separate the solid sodium halide salt. Where the product is crystallizable from the solution, the latter, instead of being warmed, may be cooled, say, to room temperature or lower to drop out the tin hydrocarbon product, which is then removed by filtration. The filtrate from the latter step may sometimes contain a tin hydrocarbon monohalide compound and it is desirable to recycle such filtrate to the second reaction step to convert the monohalide compound to the final tin hydrocarbon compound.

Where the product is not crystallizable from the solution, or only with difficulty, it is preferred to separate it by fractional distillation.

It has been found desirable in some cases to employ catalysts in the first stage in amounts, say, of about 0.1 to about 5% by weight of the hydrocarbon halide to aid in initiating the reaction. Friedel and Crafts type catalysts such as aluminum chloride, zinc chloride, ferric chloride and the like are useful in this connection. Another useful catalyst is amyl alcohol.

The following examples are illustrative of the invention:

*Example 1*

This example illustrates the formation of tetraphenyl tin. 46 grams (2 mols.) of metallic sodium were melted under 500 cc. toluene and stirred vigorously with a mechanical stirrer until the sodium had been broken up into fine globules. The mixture was allowed to cool, stirring being continued until the temperature reached 45° C., when a considerable amount, but less than 1 mol. of chlorobenzene was added. The reaction did not proceed at this temperature until about 2.2 grams of tin tetrachloride catalyst was added and then it took hold, the temperature being held between 45 to 50° C. The balance of the chlorobenzene (total 113 grams, 1 mol.) was added over about a 30-minute period, the temperature being maintained at the stated level. After the reaction was substantially complete, about 63 grams of stannic chloride was added drop by drop over a 30-minute period, still maintaining a temperature of about 45° C. A few minutes after the last of the tin tetrachloride had been added, the reaction was finished. The batch was then heated to about 95° C. and filtered to remove the sodium chloride formed in the reaction. The filtrate was cooled to about 10° C. to throw out the tetraphenyl tin product in fine needle-like crystals. These were filtered off, washed with cold benzene and dried. The tetraphenyl tin thus recovered weighed 54 grams. Yield, based on the chlorobenzene, 50.5%.

*Example 2*

This example illustrates the formation of butyl triphenyl tin. 46 grams of sodium were reduced to finely divided form as in Example 1. When the temperature of the sodium-toluene suspension had been brought to about 40° C., 22 grams of chlorobenzene and 2.2 grams of stannic chloride catalyst were added. After a few minutes the reaction started, and 91 grams of chlorobenzene were added at a rate which kept the temperature at about 45° C. It required 40 minutes for the addition, and a few minutes later the reaction was complete. Then 94 grams of butyl tin trichloride mixed with 56 grams of chlorobenzene were added over a period of about one hour, the temperature being held at about 38° C. When the reaction was over, the mass was heated to about 90° C. and filtered hot to remove sodium chloride. The filtrate was stripped of toluene by distillation at atmospheric pressure and then fractionally distilled in vacuo to remove small amounts of byproducts such as tributyl phenyl tin and dibutyl diphenyl tin, leaving 92.5 grams of butyl triphenyl tin as product. Yield, 68% based on the chlorobenzene; 65% based on the butyl tin trichloride.

In connection with Example 2, and as explained above, if products such as tributyl phenyl tin or dibutyl diphenyl tin are chiefly desired, then instead of using butyl tin trichloride to react with the phenyl chloride, tributyl tin chloride or dibutyl tin dichloride should be used.

While the invention has been described in connection with selected embodiments thereof, it will be appreciated that obvious variations are possible without departing from its scope.

In the light of the foregoing description, the following is claimed:

1. A two-stage process for making organo-tin compounds in which the organo portion consists of hydrocarbon radicals from the group consisting of aryl and mixed aryl-alkyl radicals, which comprises: reacting to completion in a first stage an aryl monohalide with finely divided sodium dispersed in an inert hydrocarbon solvent at a temperature of about 30 to about 50° C. to produce an aryl-sodium compound; then in a second stage adding to the foregoing reaction mixture the compound $R_xSnCl_y$, in which R is an alkyl radical, Sn is tin, Cl is chlorine, $x$ is a whole number having a value in the range of 0 to 3, and $y$ is a whole number equal to $4-x$, and reacting said latter compound with the aryl-sodium compound at a temperature of about 25° C. to about 50° C. to produce the organo-tin compound as above identified, and recovering the latter.

2. Process according to claim 1 in which the aryl monohalide is a phenyl monohalide.

3. Process according to claim 2 in which $x$ is equal to zero.

4. Process according to claim 2 in which $x$ is equal to one.

5. Process according to claim 2 in which $x$ is equal to two.

6. Process according to claim 2 in which $x$ is equal to three.

7. Process according to claim 1 in which a Friedel and Crafts type metal halide is present in the first stage.

8. Process according to claim 1 in which amyl alcohol is present in the first stage.

9. Process according to claim 4 in which R is butyl.

10. Process according to claim 5 in which R is butyl.

11. Process according to claim 6 in which R is butyl.

ERNEST W. JOHNSON.
JAMES M. CHURCH.

REFERENCES CITED

The following references are of record in the file of this patent:

UNITED STATES PATENTS

| Number | Name | Date |
| --- | --- | --- |
| 1,639,947 | Kraus et al. | Aug. 23, 1927 |
| 1,938,180 | Groll | Dec. 5, 1933 |
| 2,431,038 | Harris | Nov. 18, 1937 |

OTHER REFERENCES

Gilman, ed.: "Organic Chemistry" (2nd ed., 1943), vol. I, pp. 540–541.